United States Patent Office 2,905,650
Patented Sept. 22, 1959

2,905,650

OIL-MODIFIED GLYCERIN-GLYCOL-TEREPHTHALATE RESIN

Maynard C. Agens, Schenectady, N.Y., assignor to General Electric Company, a corporation of New York No Drawing. Application December 10, 1954
Serial No. 474,622

6 Claims. (Cl. 260—22)

This invention relates to oil-modified polyester resins. More particularly, this invention is concerned with oil-modified polyester resins, said resins being the product of reaction of a mixture of ingredients consisting essentially of a lower dialkyl ester of terephthalic acid, ethylene glycol, glycerin, and a fatty oil, the proportions of said ingredients being selected so that the ratio of the moles of fatty oil to the total moles of reactants is from 0.01 to 0.04, inclusive, the ratio of the number of moles of glycerin to total moles of reactants is from 0.075 to 0.25, inclusive, the ratio of hydroxyl groups to terephthalyl radicals, is greater than 2.0, and the ratio of the number of moles of glycerin to the number of moles of ethylene glycol is not more than 1.0.

Heretofore, many attempts have been made to prepare synthetic resins adaptable for use at elevated temperatures, particularly resins which are suitable for use as electrical insulation such as slot insulation and insulation for magnet wires in electrical apparatus such as motors, generators, transformers and the like which require continuous operation at temperatures of at least 125° C. It is well known to those skilled in the art that insulation on electrical conductors which are to be employed as high temperature magnet wires must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as alcohols, phenols, aliphatic and aromatic hydrocarbons, halogenated carbon compounds, etc. Magnet wire insulation must be resistant to these solvents.

In order to conserve space in electrical apparatus, it is essential that the individual wire turns which make up the coils be maintained in close proximity to each other. Because of the closeness of the turns and the fact that there may be a large potential gradient between adjacent turns, it is necessary that the resins employed as wire enamels have a high dielectric strength to prevent short circuiting between adjacent coils. In the operation of electrical apparatus containing coiled wires (magnet wires), high temperatures are often encountered and the enamels must be able to withstand these high temperatures as well as the mechanical stresses and vibrations encountered in electrical apparatus so that the enamel coating does not soften or come off the wire.

It is well known that the proper output of motors and generators can be increased a great deal by increasing the current density in the magnet wires of these machines. However, it has not been practical in the past to increase the current density through magnet wires to the extent desired because of the attendant rise in the operating temperature of the magnet wires caused by the increased current. This increased temperature has meant that conventional organic materials, which have been relatively economical, could not be used as insulating enamels on high current density windings because the higher operating temperatures encountered caused decomposition of the insulation.

Where a synthetic resin is to be used as slot insulation in a dynamoelectric machine, these same problems are again encountered so that the synthetic resin in film form must also be able to withstand these extremes of mechanical, chemical, electrical, and thermal stress. In protective coating applications, it is also desirable to have materials which will withstand extreme conditions so that the enamel will be able to withstand the atmospheric or environmental weathering which might be encountered in high temperature applications.

Heretofore, a number of synthetic resins have been developed which are satisfactory under mechanical, chemical, and electrical stress at relatively low temperatures. However, these resins are completely unsuited for use at temperatures as high as 125° C. because of thermal instability at elevated temperatures.

I have discovered a class of oil-modified polyester resins which are formed from a particular group of ingredients in particular proportions which meets all of the mechanical, chemical, electrical and thermal requirements necessary for magnet wire insulation, for slot insulation, and as a protective coating material at a continuous service temperature of at least 125° C.

In the preferred embodiment of my invention the oil-modified polyester resin is the product of reaction of dimethyl terephthalate, ethylene glycol, glycerin and soya oil, the proportions of said ingredients being selected so that the ratio of the number of moles of soya oil to the total moles of reactants is about 0.013, the ratio of the number of moles of glycerin to the total number of moles is about 0.09, the ratio of the moles of glycerin to the moles of ethylene glycol is about 0.23, and the ratio of the number of moles of hydroxyl groups to the number of moles of terephthalyl radicals is about 2.2.

While the present invention is concerned with oil-modified polyester resins per se, these resins are described and claimed in combination with electrical conductors in my copending application, Serial No. 474,623 filed concurrently herewith and assigned to the same assignee as the present invention.

The oil-modified polyester resins of the present invention may be formed in any of the conventional ways. Thus, these resins may be prepared by a three step process which comprises first forming a glycol terephthalate resin by heating ethylene glycol and a lower dialkyl ester of terephthalic acid. In the second step, fatty oil monoglycerides are prepared by heating the fatty oil with glycerin. In the third step, the glycol terephthalate polymer and the monoglycerides are heated together to form the oil-modified polyester resin. The oil-modified polyester resins may also be prepared by a two step method in which the fatty oil monoglycerides are formed as in the three step method and these monoglycerides are then reacted with ethylene glycol and a lower dialkyl ester of terephthalic acid to form the finished product. In the one step method of preparation, the lower dialkyl ester of terephthalic acid, ethylene glycol, glycerin, and the fatty oil are all heated together to form the polyester resin. The one step method is the preferred method of preparing these resins because of the simplicity of the procedure.

By the term "lower dialkyl ester of terephthalic acid," I mean esters of alcohols containing from one to eight, and preferably from one to four, carbon atoms. Among the many lower dialkyl esters of terephthalic acid which may be employed in preparing the resins used in this invention may be mentioned, the dimethyl ester, the diethyl ester, the dipropyl ester, the dibutyl ester, as well as other lower alkyl esters. In addition to using the lower dialkyl ester of terephthalic acid as the acid ingredient of the polyester resins, it should be understood that the acid itself or its chloride, or half-chloride may also be employed. In addition to using dialkyl esters where both of the alkyl radicals are the same, I may also use mixed dialkyl esters. Half esters of terephthalic acid can also be used to form these resins. However, I prefer to use lower dialkyl esters such as the dimethyl ester of terephthalic acid since these lower dialkyl esters are readily available and enter into resin forming reactions with little difficulty.

Among the many fatty oils which may be used in the practice of the present invention are included the non-drying, semi-drying, and drying fatty oils, including the vegetable oils and animal oils such as soya, cottonseed, hydrogenated cottonseed, linseed, castor, hydrogenated castor, dehydrated castor, cocoanut, tung, oiticica, menhaden, hempseed, grapeseed, corn, codliver, candelnut, walnut, perilla, poppyseed, safflower, conjugated safflower, sunflower, rapeseed, Chinawood, tristearin, whale, sardine, herring, etc. oil. Instead of using these oils per se, it should be understood that for the purposes of the present invention the fatty acids or mixtures of fatty acids which make up the fatty oils are equivalent to the fatty oils since the polyester resins of the present invention all contain glycerin. This glycerin, when combined with the fatty acids, leads to fatty acid glycerides which are the principal constituent of any of the fatty oils. Where fatty acids are used in place of the oils, the amount of glycerin should be increased in the formulation by an amount equal to one-third of the number of moles of fatty acids which are present to supply a mixture which is equivalent to a triglyceride.

In preparing the oil-modified polyester resins used in the present invention by any of the three methods outlined above, the reactants are merely added to a suitable reaction vessel made of glass, stainless steel, or any other material suitable for alcoholysis reactions and heated in the presence of a suitable alcoholysis catalyst until reaction has been effected. An alcohlysis catalyst is included in the reaction mixture to increase the rate of reaction since it is well known that alcoholysis reactions are very slow in the absence of such catalysts. Among the many alcoholysis catalysts which may be employed are included, for example, the lead oxides, lead acetate, zinc oxide, cadmium acetate, cuprous acetate, zinc acetate, lead acetate, magnesium acetate, beryllium acetate, stannic acetate, ferric acetate, nickel acetate, magnesium oxide, etc. The amount of alcoholysis catalyst employed is not critical and may vary over a wide range depending on the particular oil-modified polyester system under consideration. In general, I prefer to employ from 0.01 to about 5 percent, by weight, of the alcoholysis catalyst based on the total weight of the reactants. Higher concentrations of the catalyst may be employed but no advantage is gained thereby. Preferably, I employ about 0.1 percent, by weight, of the metallic component of the catalyst based on the total weight of the dialkyl ester employed.

Since the lower dialkyl esters of terephthalic acid are solid at room temperature and are not completely soluble in the other reactants, the starting mixture used in the present invention must be heated up to the melting point of the lower dialkyl ester before a homogeneous solution is obtained. In preparing the resins by any of the methods, it is desirable to provide the reaction vessel with a suitable reflux condenser so that the reactants do not escape from the system. The reflux condenser should be adjusted so that the lower alcohol from the lower dialkyl ester is allowed to escape from the system while the rest of the reactants are held in the reaction system. The time involved in the reaction depends on the particular method of synthesis employed. The fatty oil monoglycerides may be prepared from the fatty oil and the glycerin by heating in the presence of a catalyst for less than an hour at a temperature of from about 200° to 250° C. The ethylene glycol terephthalate may be formed by heating the lower dialykyl ester of terephthalic acid with ethylene glycol in the presence of a catalyst for a period of from about 4 to 8 hours, during which time the reaction temperature is allowed to go from room temperature to a final temperature of about 200° to 300° C. The resin may then be prepared from the monoglycerides and the glycol terephthalate by heating these compounds together for a time up to about 1 to 2 hours at a temperature up to 225° to 300° C. Where the resins used in the present invention are prepared by the two step method the oil monoglycerides, the ethylene glycol and the lower dialkyl ester of terephthalic acid are heated from room temperature to a final temperature of from 200° to 300° C. in a period of from about 4 to 8 hours. Where the one-step method is employed, all of the ingredients are merely heated together from room temperature to a final temperature of from 250° to 300° C. in a 4 to 8 hour period.

After the resin has been formed by any of the methods described above, the hot resin may be allowed to cool to a brittle solid form, or may be added hot to a suitable solvent. Among the many solvents which may be employed with the oil-modified polyester resins of the present invention are included, for example, m-cresol, polyhydroxy benzenes, mono- and polyalkyl benzenes, xylenols, etc. These resin solutions are formed by merely adding the hot resin to the solvent and filtering the resulting solution to remove any insoluble matter. In general I prefer to prepare solutions containing about 40 to 50 percent, by weight, of resin solids and to dilute these concentrated solutions, if necessary, for further use. Where the resin is obtained in the solid form and it is desired to use it subsequently from solution, these solutions may be prepared by merely adding the resin to the desired solvent and heating the mixture to a temperature of from 100° to 200° C. until solution has been effected.

Where the oil-modified polyester resins of the present invention are to be employed as films, these films may be prepared by any of the usual methods. Thus, a solution such as a cresol solution of the resin may be cast in the form of a film on a glass, plastic, or metal surface and placed in an oven for curing. Generally, these films are cured by heating them for a period of from 10 minutes to one hour in an oven maintained at a temperature of from about 200° C. to 400° C. At the end of this time a tough, flexible, transparent film is formed which may be used as slot insulation in dynamo-electric machines or for other suitable applications. These films may also be formed by extruding the resin from a suitable press through an orifice into a chamber maintained at an elevated temperature so that the films are cured as they pass through the orifice.

Where the resins of this invention are to be employed in protective coating formulations, the resin solutions are merely diluted with suitable solvents to the viscosity desired and may then be applied to the surface to be protected and cured in an oven or by infra-red heat.

Where the resins of this invention are to be employed as magnet wire insulation, a resin solution is used which preferably contains from 20 to 30 percent, by weight, of resin solids. This solution is generally formed by diluting a more concentrated resin solution to the desired solids content. This diluted solution may be applied to an electrical conductor with or without the use of a suitable curing catalyst. In general, I prefer to use such a catalyst since the rate of cure is increased thereby. Among the many curing catalysts which may be employed are included, for example, zinc octoate, cadmium octoate, aromatic diisocyanates, aliphatic diisocyanates, etc.

Where metal-containing curing catalysts are employed, I have obtained satisfactory results when using from about 0.01 to 1.0 percent, by weight, and preferably about 0.5 percent, by weight, of the metal element of the catalyst based on the total resin solids present in the solution. When using the diisocyanate catalysts, I employ from about 0.01 to 2.0 percent, and preferably about 0.5 percent, by weight, of the catalyst based on the total resin solids. The resin is preferably applied to the conductor by a die coating process which comprises placing the resin solution in a suitable vessel and passing the electrical conductor through the solution, through a suitable die, and then through a vertical wire tower to cure the resin. In general I prefer to obtain the desired build on an insulated conductor by passing the wire through the resin solution, the die, and the wire tower a number of times so as to obtain the build with a number of bakes so that a more uniform cured insulated wire is obtained.

In general, the speed at which the wire is passed through the resin solution may vary over a wide range, i.e., from about 7 to about 35 to 40 feet per minute. The wire tower temperature varies with the speed of the wire so that at higher speeds, higher tower temperatures are employed. The speed at which the wire passes through the solution and the temperature at which the wire tower (curing oven) is maintained depend upon the particular resin solution employed, the build of enamel desired, the length of the oven in which the coated wire is cured, and the molecular weight of the resin used in the coating operation. As used in the present invention the term "build" refers to the diameter of the insulated conductor minus the diameter of the original conductor. I have found that an enamel build on a 50.8 mil round copper wire of about 3 mils may be obtained by passing the wire through a solution containing 25 percent, by weight, of an oil-modified polyester resin and through a heating tower 18 feet long at speeds from about 7 to 40 feet per minute when the temperature of the wire tower is maintained at from about 300° to 440° C. The size of the dies employed in the coating operation is not critical, but for convenience I prefer to provide dies which have a clearance of from about 2.5 to 5.0 mils between the surface of the insulated conductor and the internal surface of the die.

In evaluating an insulated electrical conductor to determine if it is suitable for use as a magnet wire at temperatures of at least 125° C., a number of tests are conducted to measure the various mechanical, chemical, electrical, and thermal properties of the insulated conductor. These tests include the 25 percent elongation plus 3X flexibility test, the abrasion resistance test, the solvent resistance test, the dielectric strength test, the cut-through temperature test, and the flexibility after heat aging test. For an insulated electrical conductor to be suitable for use as a magnet wire at temperatures of at least 125° C., the insulated conductor having a diameter X must show no surface defects after being elongated 25 percent and wound about a mandrel having a diameter 3X. This is the 25 percent elongation plus 3X flexibility test. In the abrasion resistance test, the cured resin must have an abrasion resistance of at least 30 strokes. Abrasion resistance testing is described in detail in NEMA Standard MW-24, and this description is hereby incorporated by reference into the present application. In conducting the abrasion resistance tests, the detailed procedures of the above publication are followed.

For magnet wire applications, an insulated conductor must pass both a 70-30 solvent resistance test and a 50-50 solvent resistance test in order to make sure that the magnet wire will be resistant to the solvents commonly employed in varnish overcoats used in dynamoelectric machines. These solvent resistance tests are the determination of the physical appearance of an enameled wire after immersion in a refluxing bath of a specified solution. Two solution systems are used for each sample of wire. Both of these solutions contain a mixture of alcohol and toluene. The alcoholic portion is composed of 100 parts, by volume, of U.S.P. ethanol and 5 parts, by volume, of C.P. methanol. One solvent test solution (which is designated as 70-30) is 70 parts of the alcohol mixture and 30 parts of toluene. The second solution (which is designated as 50-50) consists of equal parts, by volume, of the above alcohol mixture and toluene.

In the usual operation of the test, about 250 ml. of the solution is placed in a 500 ml. round-bottomed, single-necked flask which is heated by a suitable electric heating mantle. A reflux condenser is attached to the flask and the solution is maintained at a steady reflux. A sample is formed so that three or more straight lengths of the wire having cut ends can be inserted through the condenser into the boiling solvent. After 5 minutes the wire is removed and examined for blisters, swelling or softening in the 50-50 solvent resistance test. Any visible change in the surface constitutes a failure. Soft (requiring the thumbnail to remove it) but smooth and adherent enamel is considered to pass the 50-50 solvent resistance test. In the 70-30 solvent resistance test the samples are maintained in the 70-30 solution for 10 minutes and examined for the same surface defects.

In order for an insulated electrical conductor to be employed as a magnet wire, it must have a sufficiently high dielectric strength so that there is no danger of short circuits between adjacent turns of magnet wire coils. In practice, it has been found that a dielectric strength of about 2000 volts per mil is necessary in an insulating material which is to be used in magnet wire applications. The dielectric strength is measured by increasing the potential gradient across the insulating film at a rate of 250 volts per second and taking the root mean square of the voltage at which a finite current flows through the film as the dielectric strength. Two types of samples are generally employed for measuring dielectric strength. The first type of sample is a twisted pair of wires which comprises two wires which have been twisted together a certain number of times under a certain load. The number of twists and the load are described in the aforementioned NEMA and the JAN specifications. The second type of sample commonly employed is a loop of wire which is immersed in a solution of mercury while a dielectric strength is determined between the mercury and the conductor. The results of these two tests are referred to as the "dielectric strength, volts per mil, twisted pairs," and "dielectric strength, volts per mil, mercury immersion."

In the operation of dynamoelectric machines at elevated temperatures it is necessary to have the magnet wires which make up the coils insulated with a resin which will not soften sufficiently at the elevated temperatures to allow the resin to flow away from the surface of the conductor so as to allow adjacent conductors to become short circuited. This softening characteristic of a synthetic resin is determined by measuring the cut-through temperature of the resin. Cut-through temperature is measured by crossing two insulated magnet wires and placing a 1000 gram load at the intersection and heating the entire system from room temperature to an elevated temperature at a 3° C. increase in temperature per minute. The temperature at which the insulation flows sufficiently to allow the two conductors to come into contact is the cut-through temperature. For an insulated conductor to be satisfactory for magnet wire applications at temperatures of at least 125° C. the cut-through temperature must be at least 160° C.

Since high temperature dynamoelectric machines require a continuous service life over a period of many years, it is necessary to determine the effect of heat aging on the magnet wire insulation. This effect is determined by an accelerated heat aging test. In conducting this test a sample of the cured, insulated conductor is maintained in a circulating air oven at an elevated temperature for a given period of time and the percent elongation which the enameled conductor will withstand without any surface defects showing in the enamel is a measure of the resistance to heat aging of the insulated conductor. I have found that the insulation on a magnet wire which is designed for continuous service life of at least 125° C. must withstand 10 percent elongation without any surface defects after being maintained in a circulating air oven for 100 hours at 185° C.

Unexpectedly, I have found that the particular class of oil-modified polyester resins described are able to pass all of the tests described above and are completely satisfactory for continuous service at temperatures of at least 125° C. Where an oil-modified polyester resin is prepared from ingredients other than the ingredients used in the oil-modified polyester resins described, the resulting resin is deficient in at least one of the several properties required for insulation on electrical conductors designed for use as magnet wires at temperatures of at least 125° C. Thus, an unsatisfactory product is formed when the polyester resin is prepared from an acid or a derivative of an acid other than terephthalic acid. An unsatisfactory product is obtained when a glycol other than ethylene glycol is employed, and the resin is also unsatisfactory when another polyhydric alcohol (an alcohol having more than two hydroxyl groups) is used in place of glycerin. Unsatisfactory insulated electrical conductors are also obtained when the ingredients of the polyester resin are selected in proportions other than those required in the insulated electrical conductors of the present invention. Thus, where the ratio of the moles of fatty oil to the total moles of reactants is not from 0.01 to 0.04, or where the ratio of the number of moles of glycerin to total moles of reactants is not from 0.075 to 0.25, or where the ratio of hydroxyl groups to terephthalyl radicals is not greater than 2.0, or where the ratio of the number of moles of glycerin to the number of moles of ethylene glycol is more than 1.0 insulated electrical conductors are formed which are not able to meet the requirements of insulated conductors for use in magnet wire applications at continuous service temperatures of at least 125° C.

In the following illustrative examples, the preparation and properties of a number of oil-modified polyester resins within the scope of the present invention are described. Each example describes the preparation of the resin and the wire speed and curing temperature employed in applying the resin to the conductor and the properties of the resulting insulated electrical conductor. In all of the examples, the resins are formed by either the one step, the two step, or the three step method, from dimethyl terephthalate, ethylene glycol, glycerin, and a fatty oil. In each case the proportions of reactants are selected so that the ratio of the moles of fatty oil to total moles of reactants is from 0.010 to 0.04, inclusive, the ratio of the number of moles of glycerin to total moles of reactants is from 0.075 to 0.25, inclusive, the ratio of hydroxyl groups of terephthalyl radicals is greater than 2.0, and the ratio of the number of moles of glycerin to the number of moles of ethylene glycol is not more than 1.0. In all cases the resin is applied to the conductor by passing the conductor through a resin solution, through a suitable die, and through an 18 foot vertical curing oven or wire tower with six passes being employed to obtain the final build. After the last pass through the oven, the wires are cooled and wound on a reel. Samples taken from the reel are then tested for build, flexibility, abrasion resistance, cut-through temperature, percent elongation after heat aging for 100 hours at 185° C., solvent resistance, and in some cases dielectric strength. In the case of abrasion resistance, the load on the needle was always that required by NEMA Standard MW-24 and JAN-W-583. In all of the examples where cresol is mentioned as a solvent, the cresol used was the U.S.P. variety comprising a mixture of isomeric cresols (primarily m-cresol) in which 90 percent of the mixture distills at 195 to 205° C. at atmospheric pressure and which has a specific gravity of 1.030 to 1.039 at 25° C. The glycerin used in the examples is 95 percent glycerin which contains about 5 percent moisture. Where hydrogenated cottonseed oil is mentioned in the examples, this oil has an iodine number of about 2.8. The wires prepared in all of these examples passed the 25 percent elongation plus 3X flexibility test and both the 70–30 and the 50–50 solvent resistance tests.

*Example 1*

This example describes the preparation of an oil-modified polyester resin by the three step method from the ingredients listed below and the application of the resulting resin to a 50.8 mil round copper wire.

|  | Moles |
|---|---|
| Dimethyl terephthalate | 2.0 |
| Ethylene glycol | 2.2 |
| Glycerin (95%) | 0.377 |
| Soya oil | 0.189 |

The soya oil and the glycerin were heated together with stirring to about 230° to 240° C. under nitrogen for one-half hour in the presence of 0.3 percent, by weight, of litharge based on the weight of the oil. This resulted in a mixture of monoglycerides of the acids present in the soya oil. A glycol terephthalate polymer was formed by adding the dimethyl terephthalate and the ethylene glycol with 0.2 gram of magnesium oxide to a one liter, three-necked, ground glass jointed flask equipped with a nitrogen inlet tube and a thermometer in one of the side necks, a glycerol-sealed stirrer in the center neck, and a Dean-Stark trap in the third neck. On top of the trap was a reflux condenser to return the distillate to the trap. A slow stream of nitrogen was bubbled through the reaction mixture while the reactants were rapidly brought to 140° C. The reactants were then heated for about 5½ hours from 140° C. to about 285° C. to form the glycol terephthalate polymer. The oil-modified polyester resin was then prepared by reacting together the soya monoglycerides and the glycol terephthalate polymer at 300° C. for one hour. At the end of this heating period the hot resin was poured into sufficient cresol to give a solids content of about 45 percent. Sufficient zinc octoate was added to this solution to give 0.5 percent zinc based on the total resin solids present and the catalyzed solution was then diluted to a solids content of 25 percent, by weight, with xylene. This solution was then applied to 50.8 mil round copper wire at a speed of 7 feet per minute with a curing temperature of 300° C. to give a 2.9 mil build on the conductor. The resulting insulated wire had a dielectric strength of 3000 volts per mil, mercury immersion, and 2900 volts per mil, twisted pair. This conductor had an abrasion resistance greater than 93 strokes, a cut-through temperature greater than 270° C., and an elongation of 25 percent after heat aging for 100 hours in a 185° C. circulating air oven.

*Example 2*

This example describes the preparation of an oil modified polyester resin by the two step method and the application of this resin to 50.8 mil round copper wire. In this case the reactants used were the same as in Example 1. Soya monoglycerides were formed by reacting the soya oil and the glycerin by the method of Example 1 and the resulting monoglycerides, the dimethyl terephthalate, and the ethylene glycol were added to a glass reaction vessel and were heated with stirring under a nitrogen stream from room temperature up to a final temperature of about 290° C. in about 7 hours. At this time the resin was poured into sufficient cresol to give a solution containing about 45 percent, by weight, of solids. After adding the usual zinc octoate catalyst, this solution was diluted to 25 percent by weight, of solids with xylene and applied to 50.8 mil round copper wire at a speed of 7 feet per minute with a wire tower temperature of 300° C. to give a build of 2.9 mils. The resulting insulated conductor had a dielectric strength of 2800 volts per mil, mercury immersion, an abrasion resistance of 46 strokes, a cut-through temperature in excess of 260° C., and had an elongation of 19 percent after being maintained 100 hours in a 185° C. circulating air oven.

*Example 3*

This example shows the preparation of an oil-modified polyester resin by the one step method and the application of this resin to 50.8 mil round copper wire. The reactants employed in this example are the same as those employed in Example 1. All of these ingredients were added to a reaction vessel together with 0.4 gram of litharge and the reaction mixture was heated with stirring and with nitrogen bubbling through the reactants from room temperature up to a final temperature of about 285° C. in about 7 hours. At this time the hot resin was poured into sufficient cresol to give a solution having a solids content of about 45 percent, by weight. This solution was catalyzed with sufficient zinc octoate to give 0.5 percent zinc based on total resin solids and diluted to a solids content of 27 percent, by weight, by the addition of cresol. This solution was then applied to a 50.8 mil round copper wire under the conditions described in the table to give an insulated electrical conductor having the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 7 | 301 | 2.5 | 80+ | 285+ | 32 |
| 9 | 301 | 3.2 | 76+ | 280+ | |

*Example 4*

Following the procedure of Example 3, the following ingredients were heated from room temperature to a final temperature of about 270° C. over a period of about 7 hours:

Dimethyl terephthalate _____moles__ 2.0
Ethylene glycol_____do____ 2.2
Glycerin (95%)_____do____ 0.377
Conjugated safflower oil_____do____ 0.189
Litharge _____grams__ 0.4

A 45 percent, by weight, solution of this resin in cresol was formed and the usual zinc octoate catalyst was added before the solution was diluted to a solids content of 25 percent with xylene and applied to a 50.8 mil round copper wire at a speed of 7 feet per minute, and a tower temperature of 302° C. to form an insulated conductor having a build of 5.6 mils. The conductor had an abrasion resistance of 38 strokes, a cut-through temperature of 240° C., and elongated 14 percent after heat aging for 100 hours at 185° C.

*Example 5*

Following the procedure of Example 4, a resin was prepared from the same ingredients used in that example except that regular safflower oil was substituted for the conjugated safflower oil. After applying the diluted resin solution to 50.8 mil round copper wire at 7 feet per minute to give a build of 2.8 mils, the wire was subjected to the usual tests and was found to have an abrasion resistance of 46 strokes, a cut-through temperature in excess of 250° C., and 13 percent elongation after 100 hours heat aging at 185° C.

*Example 6*

Following the procedure of Example 4 and with the same ingredients used in that example except with cottonseed oil substituted for the conjugated safflower oil, a resin was formed, dissolved in cresol, catalyzed with zinc octoate, and diluted to a solids content of 25 percent with xylene and applied to a 50.8 mil round copper wire at a speed of 7 feet per minute with a curing temperature of 301° C. to give a build of 2.8 mils. This enameled wire had an abrasion resistance of 57 strokes, a cut-through temperature in excess of 250° C., and an elongation of 11 percent after the 185° C. heat aging test. Another batch of enamel was prepared using this same formulation and procedure and was applied to 50.8 mil round copper wire at a speed of 20 feet per minute with curing at 398° C. to give a total build of 2.4 mils. This conductor had an abrasion resistance of 30 strokes, a cut-through temperature of 185° C. and 10 percent elongation after the 185° C. heat aging test.

*Example 7*

Following the procedure of Example 3 a resin was prepared by heating the following ingredients from room temperature to a final temperature of about 260° C. after 7 hours:

Dimethyl terephthalate _____moles__ 2.00
Ethylene glycol_____do____ 1.00
Glycerin (95%)_____do____ 1.00
Soya oil_____do____ 0.11
Litharge _____grams__ 0.4

This resulting resin was diluted to 42.2 percent solids in cresol and sufficient zinc octoate was added to give 0.5 percent zinc based on total resin solids and the catalyzed solution was then diluted to 30 percent, by weight, of solids with xylene and applied to 50.8 mil round copper wire at a speed of 20 feet per minute with curing at 383° C., to give a build of 3.3 mils. The resulting insulated conductor had an abrasion resistance in excess of 100 strokes, a cut-through temperature in excess of 250° C., and an elongation of 12 percent in the 185° C. heat aging test.

*Example 8*

An oil-modified polyester resin was prepared by heating the following ingredients from room temperature to a final temperature of about 265° C. over a 6½ hour period:

Dimethyl terephthalate _____moles__ 2.00
Ethylene glycol_____do____ 1.40
Glycerin (95%)_____do____ 0.64
Soya oil_____do____ 0.08
Cobalt acetate_____grams__ 0.4
Litharge _____do____ 0.2

The cobalt acetate was added at the beginning of the reaction and the litharge was added when the temperature of the reaction mixture reached 235° C. The hot resin was added to sufficient cresol to give a solution containing 43.3 percent, by weight, of solids, sufficient zinc octoate was added to this solution to give 0.5 percent zinc based on total resin solids and the catalyzed solution was then diluted to a solids content of 30 percent, by weight, with xylene and applied to 50.8 mil round copper wire at a speed of 18 feet per minute with a curing temperature of 394° C. to give a build of 2.5 mils. This wire had an abrasion resistance of 47 strokes, a cut-through temperature in excess of 255° C. and 10 percent elongation in the 185° C. heat aging test.

Example 9

Following the procedure of Example 8, a resin was prepared from the following ingredients:

| | | |
|---|---|---|
| Dimethyl terephthalate | moles | 2.000 |
| Ethylene glycol | do | 1.623 |
| Glycerin (95%) | do | 0.544 |
| Soya oil | do | 0.068 |
| Cobalt acetate | grams | 0.4 |
| Lead oxide | do | 0.2 |

This resin was dissolved in sufficient cresol to give a solution containing 46.2 percent, by weight, of solids and catalyzed with zinc octoate in an amount sufficient to give 0.5 percent zinc based on resin solids. The solution was then diluted to 30 percent solids with xylene and applied to 50.8 mil round copper wire at a speed of 20 feet per minute with a curing temperature of 395° C. to give a 3.0 mil build. This insulated conductor had an abrasion resistance in excess of 51 strokes and a cut-through temperature of 220° C., and 24 percent elongation in the 185° C. heat aging test.

Example 10

An oil-modified polyester resin was prepared by heating the following ingredients from room temperature to a final temperature of about 275° C. over a period of about 11 hours:

| | | |
|---|---|---|
| Dimethyl terephthalate | moles | 2.000 |
| Ethylene glycol | do | 1.50 |
| Glycerin (95%) | do | 0.453 |
| Soya oil | do | 0.0526 |
| Lead oxide | grams | 0.4 |

A 45.1 percent cresol solution of this resin was catalyzed with sufficient zinc octoate to give 0.5 percent zinc based on total resin solids and diluted to a solids content of 30 percent, by weight, with xylene and applied to 50.8 mil round copper wire under the conditions described in the table below to give the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 18 | 399 | 2.6 | 46 | | |
| 20 | 397 | 2.9 | 71+ | 210 | 12 |

Example 11

A resin was prepared by heating the following ingredients from room temperature to a final temperature of about 265° C. in about 8 hours:

| | | |
|---|---|---|
| Dimethyl terephthalate | moles | 2.00 |
| Ethylene glycol | do | 1.50 |
| Glycerin (95%) | do | 0.50 |
| Soya oil | do | 0.1075 |
| Litharge | grams | 0.4 |

A 46 percent cresol solution of this resin was catalyzed with the usual amount of zinc octoate and diluted to a solids content of 30 percent with xylene and applied to 50.8 mil round copper wire at a speed of 20 feet per minute with a curing temperature of 393° C. to give a 2.5 mil build. This insulated magnet wire had an abrasion resistance of 51 strokes, a cut-through temperature of 240° C., and 10 percent elongation after the 185° C. heat aging.

Example 12

An oil-modified polyester resin was prepared by heating the following ingredients from room temperature to a final temperature of about 275° C. in about 7 hours:

| | | |
|---|---|---|
| Dimethyl terephthalate | moles | 2.000 |
| Ethylene glycol | do | 1.70 |
| Glycerin (95%) | do | 0.377 |
| Soya oil | do | 0.08 |
| Litharge | grams | 0.4 |

A 41.5 percent cresol solution of this resin was catalyzed with zinc octoate to give 0.5 percent zinc based on total resin solids and after being diluted to 30 percent solids with xylene was applied to 50.8 mil round copper wire at a speed of 20 feet per minute and a curing temperature of 393° C., to give a build of 3.4 mils. This insulated electrical conductor had an abrasion resistance of 31 strokes, a cut-through temperature of 210° C., and 21 percent elongation in the 185° C. heat aging test.

Example 13

This example describes the preparation of the preferred resin of my invention. This resin was prepared by heating the following ingredients from room temperature to a final temperature of about 280° C. over a 7 hour period:

| | | |
|---|---|---|
| Dimethyl terephthalate | moles | 2.000 |
| Ethylene glycol | do | 1.623 |
| Glycerin (95%) | do | 0.377 |
| Soya oil | do | 0.0509 |
| Litharge | grams | 0.4 |

A 45.5 percent cresol solution of this resin was catalyzed with zinc octoate and diluted to a solids content of 30 percent with xylene and applied to 50.8 mil round copper wire under the conditions described in the table below to give the properties listed in the table:

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 18 | 395 | 2.7 | 54 | | 10 |
| 19 | 395 | 3.1 | 49 | 205 | |
| 20 | 390 | 3.2 | 54 | 190 | 27 |
| 20 | 394 | 3.0 | 45 | 200 | |
| 21 | 395 | 3.3 | 47 | 190 | 25 |

Example 14

This example describes the preparation of an oil-modified polyester resin within the scope of the present invention and the application of this resin to a conductor under a variety of different coating conditions. A resin was prepared by heating the ingredients in the proportions listed below from room temperature to a final temperature of about 275° C. over a period of about six hours:

| | | |
|---|---|---|
| Dimethyl terephthalate | moles | 2.000 |
| Ethylene glycol | do | 1.623 |
| Glycerin (95%) | do | 0.377 |
| Hydrogenated cottonseed oil | do | 0.0509 |
| Litharge | grams | 0.4 |

A 45 percent cresol solution of this resin was catalyzed with sufficient zinc octoate to give 0.5 percent zinc based on total resin solids and was then diluted to a solids content of 30 percent, by weight, and applied to 50.8 mil round copper wire under the conditions described in the table below to give insulated electrical conductors having the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 7 | 301 | 3.5 | 87+ | 300+ | |
| 8 | 300 | 3.9 | 58 | 275+ | |
| 8 | 320 | 3.3 | 88+ | 250+ | |
| 10 | 300 | 3.8 | 73 | 235 | |
| 10 | 320 | 3.5 | 89+ | 245 | |
| 10 | 340 | 2.7 | 91+ | 260+ | |
| 12 | 319 | 3.7 | 40 | 200 | |
| 12 | 340 | 3.2 | 85 | 250 | |
| 14 | 340 | 3.7 | 69 | 265+ | 37+ |
| 14 | 360 | 2.7 | 91+ | 235 | |
| 16 | 360 | 3.7 | 81+ | 200 | |
| 18 | 358 | 3.8 | 62 | 175 | |
| 18 | 381 | 3.0 | 33 | 200 | |
| 20 | 381 | 3.3 | 89+ | 180+ | |
| 22 | 380 | 3.1 | 63+ | 200 | 37+ |
| 22 | 403 | 3.4 | 40 | 175 | |
| 24 | 403 | 3.0 | 39 | 170 | |
| 26 | 403 | 3.3 | 63+ | 170 | |
| 28 | 433 | 2.7 | 31 | 175 | |
| 30 | 433 | 3.0 | 31 | 160 | 37+ |

*Example 15*

A tristearin modified polyester resin was prepared by heating the following ingredients from room temperature to a final temperature of about 280° C. in about 7 hours:

| | | |
|---|---|---|
| Dimethyl terephthalate | moles | 2.000 |
| Ethylene glycol | do | 1.623 |
| Glycerin (95%) | do | 0.377 |
| Tristearin | do | 0.05 |
| Litharge | grams | 0.4 |

A 45.5 percent cresol solution of this resin was mixed with sufficient zinc octoate to give 0.5 percent zinc based on total resin solids and then diluted to a solids content of 30 percent, by weight, with xylene and applied to 50.8 mil round copper wire under the conditions described in the table below to form insulated electrical conductors having the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 18 | 399 | 2.7 | 50 | | |
| 20 | 399 | 2.9 | 49 | 170 | |
| 22 | 398 | 3.2 | 57 | 180 | 37+ |
| 26 | 399 | 3.4 | 40 | 147.5 | |
| 28 | 400 | 3.6 | 33 | 140 | 37+ |

*Example 16*

A hydrogenated castor oil modified polyester resin was prepared by heating the following ingredients to 275° C. over a period of 7 hours:

| | | |
|---|---|---|
| Dimethyl terephthalate | moles | 3.000 |
| Ethylene glycol | do | 2.43 |
| Glycerin (95%) | do | 0.565 |
| Hydrogenated castor oil | do | 0.0715 |
| Lead acetate 3H₂O | grams | 2.32 |

A 45.4 percent cresol solution of this resin was mixed with sufficient zinc octoate to give 0.5 percent zinc based on total resin solids, diluted to 30 percent, by weight, of solids with xylene and applied to 50.8 mil round copper wire under the conditions described in the table below to give an insulated magnet wire with the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 18 | 398 | 2.8 | 47 | 205 | 25 |
| 20 | 398 | 3.4 | 43 | 165 | |
| 22 | 398 | 3.9 | 33 | 180 | 37+ |

*Example 17*

An oil-modified polyester resin was prepared by heating the following ingredients to 250° C. over a 4½ hour period:

| | | |
|---|---|---|
| Dimethyl terephthalate | moles | 6.0 |
| Ethylene glycol | do | 4.0 |
| Glycerin (95%) | do | 2.0 |
| Hydrogenated cottonseed oil | do | 0.15 |
| Litharge | grams | 1.3 |
| Xylene | do | 290 |

In preparing this resin all of the ingredients except the litharge and 90 grams of the xylene were added at the beginning of the reaction. During the initial heating period the moisture present in the glycerin distilled azeotropically with a portion of the xylene and after this azeotropic distillation had taken place the remaining ingredients were added to the reaction mixture. After the resin had been prepared, sufficient cresol was added to give a solution having a solids content of 44.2 percent, by weight. Sufficient zinc oxide was added to this solution to give 0.5 percent zinc based on total resin solids and the catalyzed solution was diluted to 25 percent, by weight, of solids with xylene and applied to 50.8 mil round copper wire under the conditions described in the table below to give insulated electrical conductors having the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 18 | 398 | 2.0 | 99+ | 250+ | |
| 22 | 399 | 2.7 | 100+ | 250+ | 37+ |
| 26 | 400 | 2.9 | 93+ | 260+ | |
| 30 | 401 | 2.9 | 80+ | 250+ | |
| 35 | 430 | 3.0 | 76 | 230 | 37+ |

*Example 18*

An oil-modified polyester resin was prepared by the method of Example 17 by heating the following ingredients to a temperature of about 250° C. over a period of about 5 hours:

| | | |
|---|---|---|
| Dimethyl terephthalate | moles | 6.00 |
| Ethylene glycol | do | 3.50 |
| Glycerin (95%) | do | 2.50 |
| Hydrogenated cottonseed oil | do | 0.15 |
| Litharge | grams | 1.3 |
| Xylene | do | 260 |

Sufficient zinc octoate was added to a 45 percent cresol solution of this resin to give 0.5 percent zinc based on total resin solids. The catalyzed solution was then diluted to a solids content of 30 percent, by weight, with xylene and applied to 50.8 mil round copper wire under the conditions described in the table below to give insulated electrical conductors having the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 22 | 399 | 3.0 | 100+ | 250 | 29 |
| 26 | 399 | 3.6 | 65 | 245+ | |
| 35 | 432 | 3.2 | 90+ | 250+ | 32 |

Example 19

An oil-modified polyester resin was prepared by heating the following ingredients to a final temperature of 260° C. over a 6 hour period:

| Ingredient | Unit | Amount |
|---|---|---|
| Dimethyl terephthalate | moles | 3.000 |
| Ethylene glycol | do | 1.50 |
| Glycerin (95%) | do | 1.50 |
| Hydrogenated cottonseed oil | do | 0.75 |
| Litharge | grams | 0.6 |

A 46.8 percent cresol solution of this resin was mixed with sufficient zinc octoate to give 0.5 percent zinc based on total resin solids and then diluted to 30 percent by weight of solids with xylene. This diluted solution was applied to 50.8 mil round copper wire under the conditions described in the table below to give enameled wires having the properties listed.

| Wire speed, ft./min. | Curing temp., °C. | Build, mils | Abrasion resistance, strokes | Cut-through temp., °C. | Percent elongation after heat aging, 185° C. |
|---|---|---|---|---|---|
| 22 | 400 | 3.3 | 100+ | 270+ | 20 |
| 26 | 400 | 3.4 | 100+ | 270+ | |
| 30 | 400 | 3.6 | 88+ | 260+ | |
| 35 | 435 | 3.0 | 89+ | 275+ | 23 |

Although the foregoing examples have shown only one fatty oil in each resin of the present invention, it should be understood that a mixture of 2 or more of such oils may also be employed. These resins may also be modified by the addition of minor amounts of other synthetic resins which can act as extenders or cross-linking agents. Among the modifying resins which may be employed are included, for example, melamine formaldehyde resins, silicone resins, polyurethane resins, epoxide resins such as the epichlorohydrin bis-phenol-A resins, phenol formaldehyde resins, aniline formaldehyde resins, urea formaldehyde resins, cellulose acetate resins, polyamide resins, vinyl resins, ethylene resins, styrene resins, etc. Where these modifying resins are employed, they are mixed with the polyester resins of the present invention and the mixture is applied to an electrical conductor and cured to form magnet wire.

Although the utility of the resins of the present invention has been described only in terms of utility as slot insulation, electrical conductor insulation, and as an ingredient in protective coating formulations, it should be understood that these resins are also useful in other applications. Thus, these resins may be used in molding powders by blending the resins with various fillers such as wood flour, silica, glass fibers, diatomaceous earth and with the lubricants and dyes commonly employed in molding powder formulations. These resins may also be employed as impregnants for fibrous materials and as laminating resins.

What I claim as new and desire to secure by Letters Patent of the United States is:

1. An oil-modified polyester resin consisting essentially of the product of reaction in the presence of catalytic amounts of an alcoholysis catalyst and at elevated temperatures of a lower dialkyl ester of terephthalic acid, there being present from 1 to 4 carbon atoms in the alkyl group of the aforesaid dialkyl ester, ethylene glycol, glycerin, and a fatty oil, the proportions of the reactants being selected so that the ratio of the moles of fatty oil to the total moles of reactants is from 0.01 to 0.04, inclusive, the ratio of the number of moles of glycerin to the total moles of reactants is from 0.075 to 0.25, inclusive, the ratio of the moles of hydroxyl groups to the moles of terephthalyl radicals is greater than 2.0, and the ratio of the number of moles of glycerin to the number of moles of ethylene glycol is not more than 1.0.

2. The oil-modified polyester resin of claim 1 in which the lower dialkyl ester of terephthalic acid is dimethyl terephthalate.

3. The oil-modified polyester resin of claim 1 in which the fatty oil is soya oil.

4. The oil-modified polyester resin of claim 1 in which the fatty oil is hydrogenated cottonseed oil.

5. An oil modified polyester resin consisting essentially of the product of reaction in the presence of catalytic amounts of an alcoholysis catalyst and at elevated temperatures of dimethyl terephthalate, ethylene glycol, glycerin, and soya oil, the proportions of said reactants being selected so that the ratio of the number of moles of soya oil to the total moles of reactants is from 0.01 to 0.04, inclusive, the ratio of the number of moles of glycerin to the total moles of reactants is from 0.075 to 0.25, inclusive, the ratio of hydroxyl groups to terephthalyl radicals is greater than 2.0, and the ratio of the number of moles of glycerin to the number of moles of ethylene glycol is not more than 1.0.

6. An oil-modified polyester resin consisting essentially of the product of reaction in the presence of catalytic amounts of an alcoholysis catalyst and at elevated temperatures of dimethyl terephthalate, ethylene glycol, glycerin and soya oil, the proportions of the reactants being selected so that the ratio of the number of moles of soya oil to the total moles of reactants is about 0.013, the ratio of the number of moles of glycerin to the total moles of reactants is about 0.09, the ratio of hydroxyl groups to terephthalyl radicals is about 2.2, and the ratio of the number of moles of glycerin to the number of moles of ethylene glycol is about 0.23.

References Cited in the file of this patent

FOREIGN PATENTS 629,490     Great Britain _____ Sept. 21, 1949